(12) United States Patent
Mak

(10) Patent No.: US 9,927,586 B1
(45) Date of Patent: Mar. 27, 2018

(54) TWO-PART OPTICAL COUPLING SUBASSEMBLY FOR MONITORING OPTICAL OUTPUT POWER IN OPTICAL TRANSCEIVER

(71) Applicant: SAE Magnetics (H.K.) Ltd., Hong Kong (HK)

(72) Inventor: Wing Keung Mark Mak, Hong Kong (HK)

(73) Assignee: SAE Magnetics (H.K.) Ltd., Hong Kong (HK)

( * ) Notice: Subject to any disclaimer, the term of this patent is extended or adjusted under 35 U.S.C. 154(b) by 0 days.

(21) Appl. No.: 15/464,311

(22) Filed: Mar. 20, 2017

(51) Int. Cl.
*G02B 6/42* (2006.01)
*G02B 6/32* (2006.01)
*G02B 17/08* (2006.01)

(52) U.S. Cl.
CPC .......... *G02B 6/4286* (2013.01); *G02B 6/327* (2013.01); *G02B 6/4204* (2013.01); *G02B 6/4206* (2013.01); *G02B 6/4212* (2013.01); *G02B 6/4214* (2013.01); *G02B 6/4244* (2013.01); *G02B 17/086* (2013.01); *G02B 6/4246* (2013.01)

(58) Field of Classification Search
None
See application file for complete search history.

(56) References Cited

U.S. PATENT DOCUMENTS

| | | | |
|---|---|---|---|
| 6,636,540 B2 | 10/2003 | Uebbing | |
| 7,467,897 B2 | 12/2008 | Hauffe et al. | |
| 7,889,993 B2 | 2/2011 | Wang et al. | |
| 8,503,833 B2 | 8/2013 | Tiefenthaler | |
| 8,503,838 B2 | 8/2013 | Chen | |
| 8,787,714 B2 | 7/2014 | Morioka | |
| 9,116,312 B2 | 8/2015 | Lin | |
| 9,166,694 B2 | 10/2015 | Otte et al. | |
| 2012/0263416 A1* | 10/2012 | Morioka | G02B 6/4214 385/33 |

* cited by examiner

*Primary Examiner* — Michelle R Connelly

(57) ABSTRACT

A two-part optical coupling subassembly includes a main lens formed with a cavity, the main lens including two surfaces formed in the cavity and oppositely inclined at an off-vertical angle from a central vertical plane of the cavity such that the two surfaces are symmetric with respect to the central vertical plane; a beam router embedded in the cavity, the beam router including first and second beam router surfaces lying on the two surfaces of the main lens respectively, and a partially reflective coating on at least one of the beam router surfaces; and a transparent adhesive provided between the two lens surfaces and the first and second beam router surfaces.

14 Claims, 13 Drawing Sheets

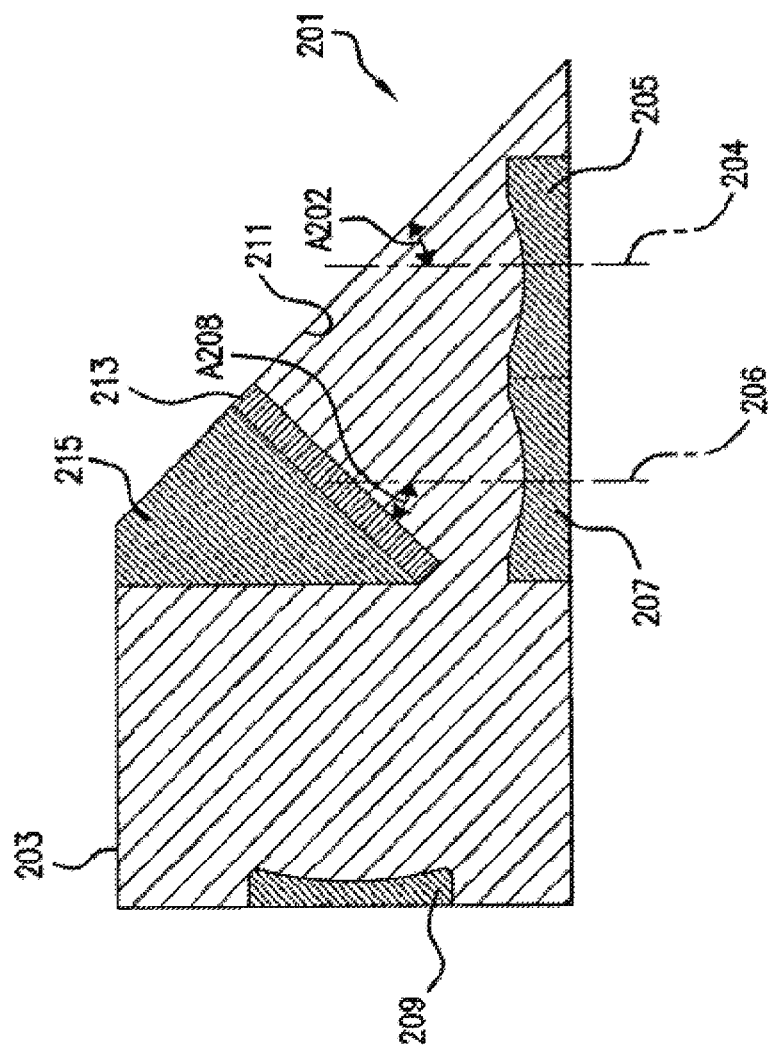

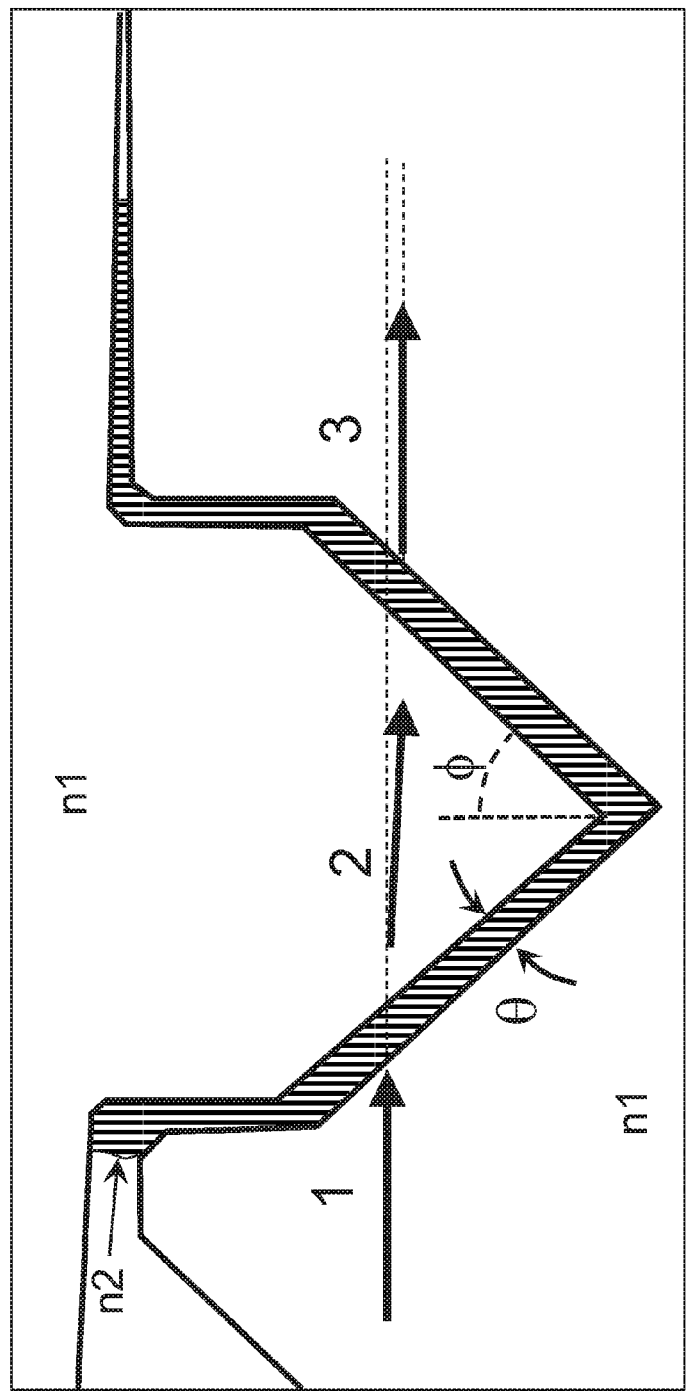

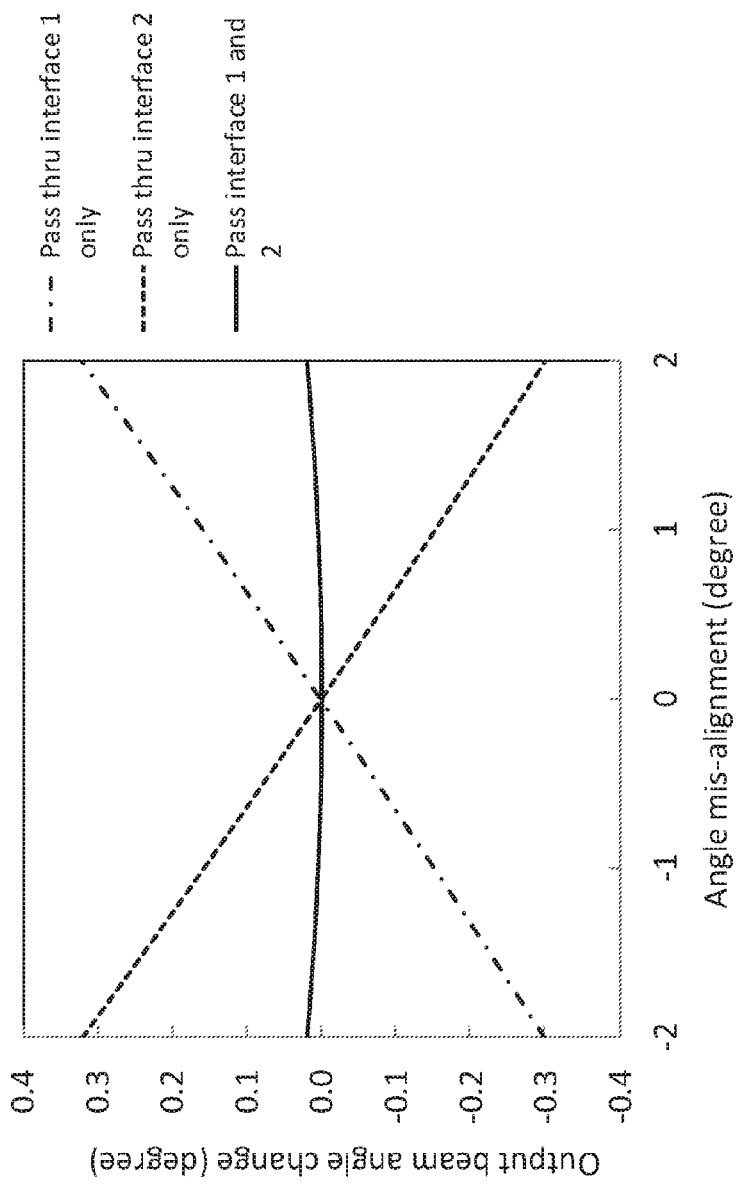

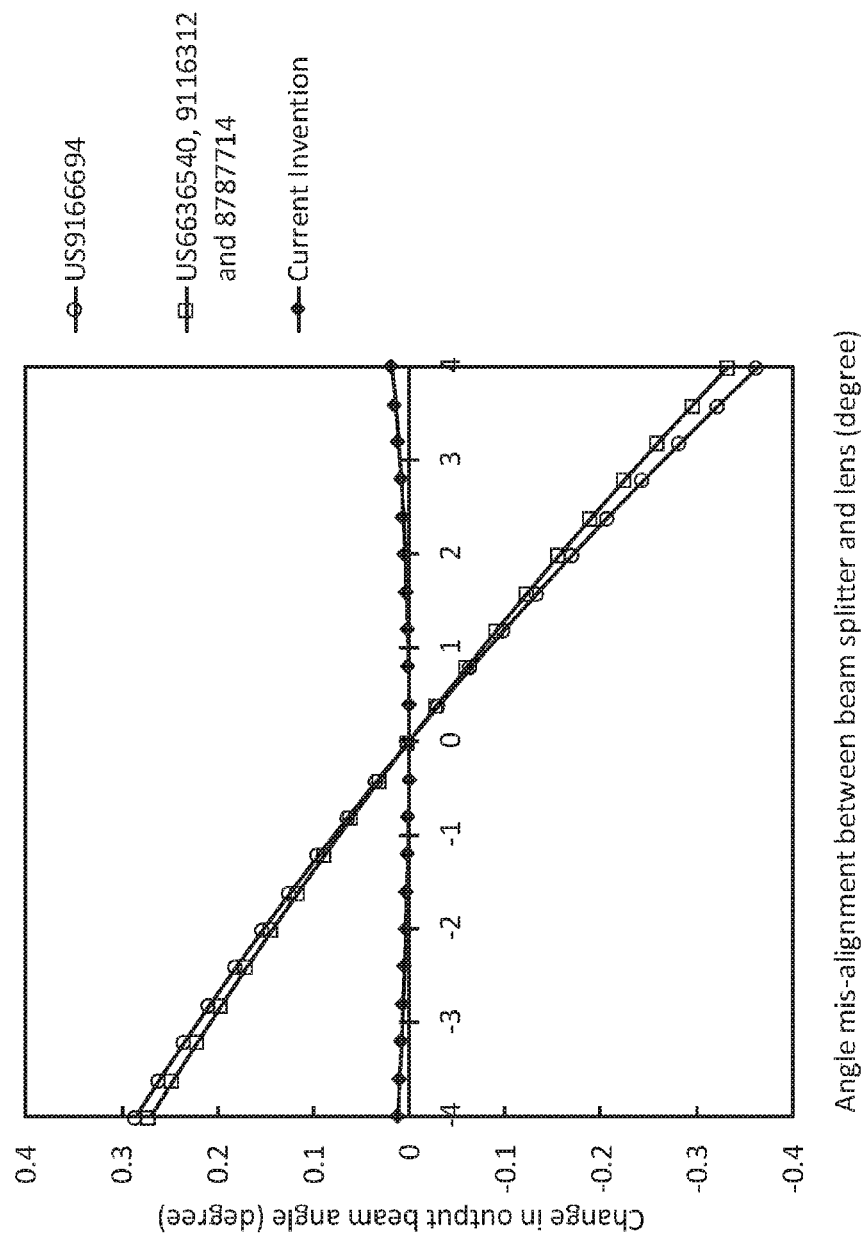

TWO-PART OPTICAL COUPLING SUBASSEMBLY FOR MONITORING OPTICAL OUTPUT POWER IN OPTICAL TRANSCEIVER

FIELD OF THE TECHNOLOGY

The present disclosure relates to optical coupling system for optical communication transceiver with optical feedback function.

BACKGROUND

To provide optical power monitoring for light transmitting from VCSEL to fiber, additional optical elements are employed to divert portion of light power before being coupled to a fiber. The diverted light is then followed by light detection. Among different detection schemes, photodetector is the most commonly used because it gives electrical output that can feedback to electronic circuit directly and easily. However, various schemes had been developed for light extraction in different optical designs. Few main schemes, such as diffraction grating, micro-structure on optical surface and beam-splitting by partial reflective filter, had been proposed for light extraction purposes.

FIG. 2a (U.S. Pat. No. 6,636,540) shows key elements of the coupling system include a collimation lens for light emitting from VCSEL, a beam splitter to divert portion of light from optical path to output fiber, and a focusing lens to couple light into the output fiber. Owing to dimension constraint within an optical transceiver, this coupling lens is just few centimeters in size and requires dimension accuracy, especially on optical surfaces. The industrial manufacturing solution for such optical system is by precise injection molding with high-temperature thermoplastic, such as Polyetherimide (e.g. Ultem). The refractive index of Ultem is about 1.62 and has lower material absorption at the VCSEL emission wavelength around 850 nm. Collimated light beam incident on the 45 degrees slanted interface formed with lens body and air, undergone total internal reflection (TIR) and light beam direction was bent by 90 degrees.

In U.S. Pat. No. 6,636,540, a concave indention was included in lens body where 90 degrees turned collimated optical beam intercepts. A two-part optics, namely a beam splitting plate and a wedge, where the reflection at the interface was used to provide feedback. Given the lens size mentioned earlier, assembly process of two miniature size optical parts into the desired position in the indention on the lens is rather difficult to keep variation in optical alignment small.

A modified optical design by combining the beam splitting plate and the wedge into a single piece, the prism, was disclosed in FIG. 2b (U.S. Pat. No. 8,787,714). The assembly process was simplified but the optical alignment to output fiber was still sensitive to the position of the prism in filler matrix.

FIG. 2c (U.S. Pat. No. 9,116,312) and FIG. 2d (U.S. Pat. No. 9,166,694) depict another two schemes in which shape matched beam splitting insert was assembled into a lens cavity. Comparing to FIG. 2a, the advantage of this approach is that it helps to reduce optical alignment variation, in turns smaller fiber coupling efficiency variation caused by assembly process can be obtained.

The above description of the background is provided to aid in understanding an optical coupling subassembly, but is not admitted to describe or constitute pertinent prior art to the optical coupling subassembly, or consider the cited documents as material to the patentability of the claims of the present application.

SUMMARY

An object of the present application is to provide an optical coupling system with feedback function for an optical transceiver so that coupling efficiency and alignment to the center of a fiber is tolerated for assembly process variation, stable over temperature and change in refractive index of material.

According to one aspect, there is provided a two-part optical coupling subassembly including:
a main lens formed with a cavity, the main lens including:
  a first surface formed with a first collimating lens for collimating light from a vertical-cavity surface-emitting laser;
  a second surface oriented at an angle with respect to the first surface for reflecting collimated light from the first collimating lens to an optical fiber;
  a third surface formed in the cavity and inclined at an off-vertical angle from a central vertical plane of the cavity;
  a fourth surface formed in the cavity and oppositely inclined at the off-vertical angle from the central vertical plane such that the third and fourth surfaces are symmetric with respect to the central vertical plane; and
  a fifth surface facing the optical fiber;
a beam router embedded in the cavity, the beam router including:
  a first beam router surface lying on the third surface of the main lens;
  a second beam router surface lying on the fourth surface of the main lens; and
  a partially reflective coating provided on one of the first and second beam router surfaces;
and a transparent adhesive provided between the third surface and the first beam router surface, and between the fourth surface and the second beam router surface;
wherein collimated light reflected from the second surface of the main lens passes through a first interface defined by the third surface, the first beam router surface and the transparent adhesive in between, enters into the beam router, passes through a second interface defined by the second beam router surface, the fourth surface of the main lens and the transparent adhesive in between, re-enters the main lens and propagates to the fifth surface of the main lens where the light exists and directs to the optical fiber; and wherein a portion of the collimated light is reflected by the partially reflective coating, decoupled from light transmitting towards the optical fiber, and directed to a light detector to monitor optical output power;
whereby the oppositely inclined first and second interfaces provide self-correction of output beam angle in case of misalignment of the beam router and the main lens.

In one embodiment, the partially reflective coating is provided on the second beam router surface, and the beam router may further include:
  a third beam router surface provided at an opposite side of the first beam router surface; and
  a fourth beam router surface provided at an opposite side of the second beam router surface;
  wherein the collimated light is partially reflected by the partially reflective coating to the third beam router surface, and in turn reflected by the third beam router surface to the fourth beam router surface, and in turn reflected by the fourth beam router surface through the first interface, out of the main lens, and to the light detector, which is located underneath the main lens.

In one embodiment, the partially reflective coating is provided on the second beam router surface, and the beam router further comprises a third beam router surface formed on an upper, top side of the beam router; and wherein the collimated light reflected from the second surface passes through the first interface and enters into the beam router, and the light is partially reflected by the partially reflective coating and decoupled from light transmitting towards the optical fiber, and the decoupled light passes through the beam router and propagates to the third beam router surface where the light exits the beam router and directs to the light detector, which is located above the beam router.

In one embodiment, the partially reflective coating is provided on the first beam router surface; and wherein the collimated light reflected from the second surface of the main lens is partially reflected from the partially reflective coating and decoupled from light transmitting towards the optical fiber, and the decoupled light re-enters the main lens and propagates to the first surface of the main lens where the light exits and directs to the light detector, which is located underneath the main lens.

In one embodiment, the off-vertical angle is between 30 to 60 degrees, preferably 45 degrees.

In one embodiment, the fifth surface is formed with a lens to focus light to the optical fiber.

In one embodiment, an optical coating is provided on one or more of the lens surfaces and the beam router surfaces to increase or decrease light transmission.

In one embodiment, the partially reflective coating may include at least one layer of dielectric film with a refractive index ranging from 1.3 to 2.3 to provide a reflectivity of 0.01 to 0.95 in the optical coupling subassembly.

According to another aspect, there is provided an optical coupling subassembly including:
- a main lens formed with a cavity, the main lens including two surfaces formed in the cavity and oppositely inclined at an off-vertical angle from a central vertical plane of the cavity such that the two surfaces are symmetric with respect to the central vertical plane;
- a beam router embedded in the cavity, the beam router including a first beam router surface lying on one of the two surfaces; a second beam router surface lying on another one of the two surfaces; and a partially reflective coating provided on one of the first and second beam router surfaces; and
- a transparent adhesive provided between one of the two surfaces and the first beam router surface, and between another one of the two surfaces and the second beam router surface.

In one embodiment, the main lens may further include:
- a first surface formed with a first collimating lens for collimating light from a vertical-cavity surface-emitting laser;
- a second surface oriented at an angle with respect to the first surface for reflecting collimated light from the first collimating lens to an optical fiber;
- a third surface, being one of the two surfaces formed in the cavity and inclined at the off-vertical angle from the central vertical plane of the cavity;
- a fourth surface, being another one of the two surfaces formed in the cavity and oppositely inclined at the off-vertical angle from the central vertical plane such that the third and fourth surfaces are symmetric with respect to the central vertical plane; and
- a fifth surface facing the optical fiber;
- wherein collimated light reflected from the second surface passes through a first interface defined by the third surface, the first beam router surface and the transparent adhesive in between, enters into the beam router, passes through a second interface defined by the second beam router surface, the fourth surface and the transparent adhesive in between, re-enters the main lens and propagates to the fifth surface where the light exists the main lens and directs to the optical fiber; and wherein a portion of the collimated light is reflected by the partially reflective coating, decoupled from light transmitting towards the optical fiber, and directed to a light detector to monitor optical output power;
- whereby the oppositely inclined first and second interfaces provide self-correction of output beam angle in case of misalignment of the beam router and the main lens.

In one embodiment, the partially reflective coating is provided on the second beam router surface, and the beam router may further include:
- a third beam router surface provided at an opposite side of the first beam router surface; and
- a fourth beam router surface provided at an opposite side of the second beam router surface;
- wherein the collimated light is partially reflected by the partially reflective coating to the third beam router surface, and in turn reflected by the third beam router surface to the fourth beam router surface, and in turn reflected by the fourth beam router surface through the first interface, out of the main lens, and to the light detector, which is located underneath the main lens.

In one embodiment, the partially reflective coating is provided on the second beam router surface, and the beam router may further include a third beam router surface formed on an upper, top side of the beam router; and wherein the collimated light reflected from the second surface passes through the first interface and enters into the beam router, and the light is partially reflected by the partially reflective coating and decoupled from light transmitting towards the optical fiber, and the decoupled light passes through the beam router and propagates to the third beam router surface where the light exits the beam router and directs to the light detector, which is located above the beam router.

In one embodiment, the partially reflective coating is provided on the first beam router surface; and wherein the collimated light reflected from the second surface is partially reflected from the partially reflective coating and decoupled from light transmitting towards the optical fiber, and the decoupled light re-enters the main lens and propagates to the first surface where the light exits the main lens and directs to the light detector, which is located underneath the main lens.

In one embodiment, the off-vertical angle is between 30 to 60 degrees, preferably 45 degrees.

In one embodiment, the fifth surface is formed with a lens to focus light to the optical fiber.

In one embodiment, an optical coating is provided on one or more of the lens surfaces and the beam router surfaces to increase or decrease light transmission.

In one embodiment, the partially reflective coating may include at least one layer of dielectric film with a refractive index ranging from 1.3 to 2.3 to provide a reflectivity of 0.01 to 0.95 in the optical coupling subassembly.

Although the optical coupling subassembly is shown and described with respect to certain embodiments, it is obvious that equivalents and modifications will occur to others skilled in the art upon the reading and understanding of the specification. The optical coupling subassembly in the present application includes all such equivalents and modifications, and is limited only by the scope of the claims.

BRIEF DESCRIPTION OF THE DRAWINGS

Specific embodiments of the optical coupling subassembly will now be described by way of example with reference to the accompanying drawings wherein:

FIG. 2a illustrates a three-part optical subassembly with beam splitting function disclosed in U.S. Pat. No. 6,636,540.

FIG. 3a illustrates the changes of beam propagation direction when transmitted through lens body-optical adhesive-lens body interfaces which are not in parallel.

FIG. 3b shows the calculated changes of beam angle in FIG. 3a with different non-parallel angle by using commonly used lens material (e.g. Ultem1010) and optical adhesive with a refractive index of 1.5.

FIG. 4 shows the calculated changes of output beam angle for the optical coupling subassembly of the present application and two prior arts as a function of non-parallel angle at interface.

DETAILED DESCRIPTION

Figure 1:
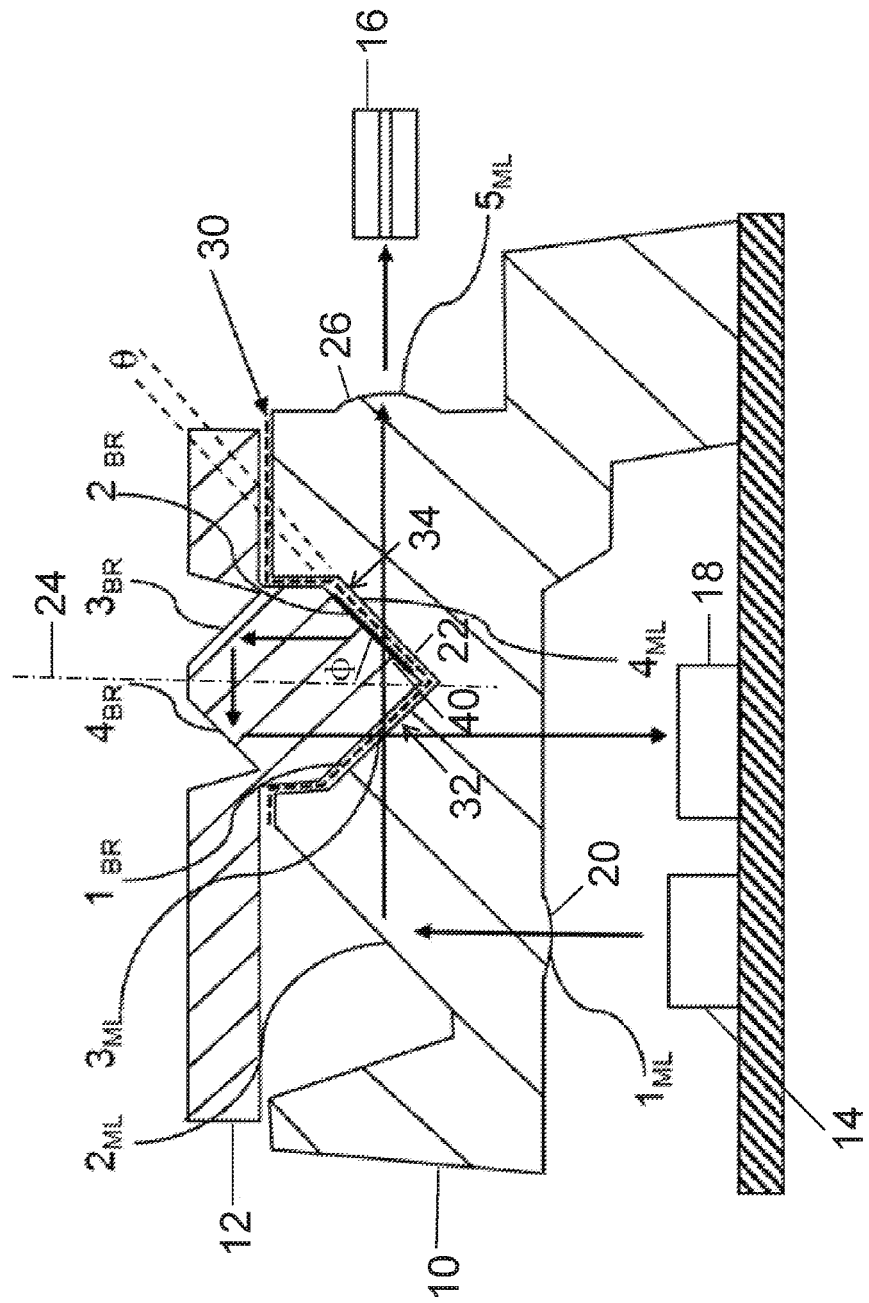
FIG. 1 is an illustration of the overview of a two-part optical subassembly providing VCSEL to fiber coupling and beam diverting function for optical feedback purpose.

Reference will now be made in detail to a preferred embodiment of the optical coupling subassembly, examples of which are also provided in the following description. Exemplary embodiments of the optical coupling subassembly are described in detail, although it will be apparent to those skilled in the relevant art that some features that are not particularly important to an understanding of the optical coupling subassembly may not be shown for the sake of clarity.

Furthermore, it should be understood that the optical coupling subassembly is not limited to the precise embodiments described below and that various changes and modifications thereof may be effected by one skilled in the art without departing from the scope of the protection. For example, elements and/or features of different illustrative embodiments may be combined with each other and/or substituted for each other within the scope of this disclosure and appended claims.

For illustration purposes, the terms such as "upper", "lower", "vertical", "horizontal", "top", "bottom", "above" or "underneath" appeared hereinafter relate to the invention as it is oriented in the drawings. It is understood that the invention may assume various positions, except where expressly specified to the contrary. Furthermore, it is understood that the specific devices shown in the drawings, and described in the following description, are simply exemplary embodiments of the invention. Hence, specific dimensions and other physical characteristics related to the embodiments disclosed hereinafter are not to be considered as limiting.

FIG. 1 is an illustration of the overview of a two-part optical subassembly providing VCSEL to fiber coupling and beam diverting function for optical feedback purpose. Details will be described later.

Figure 2B:
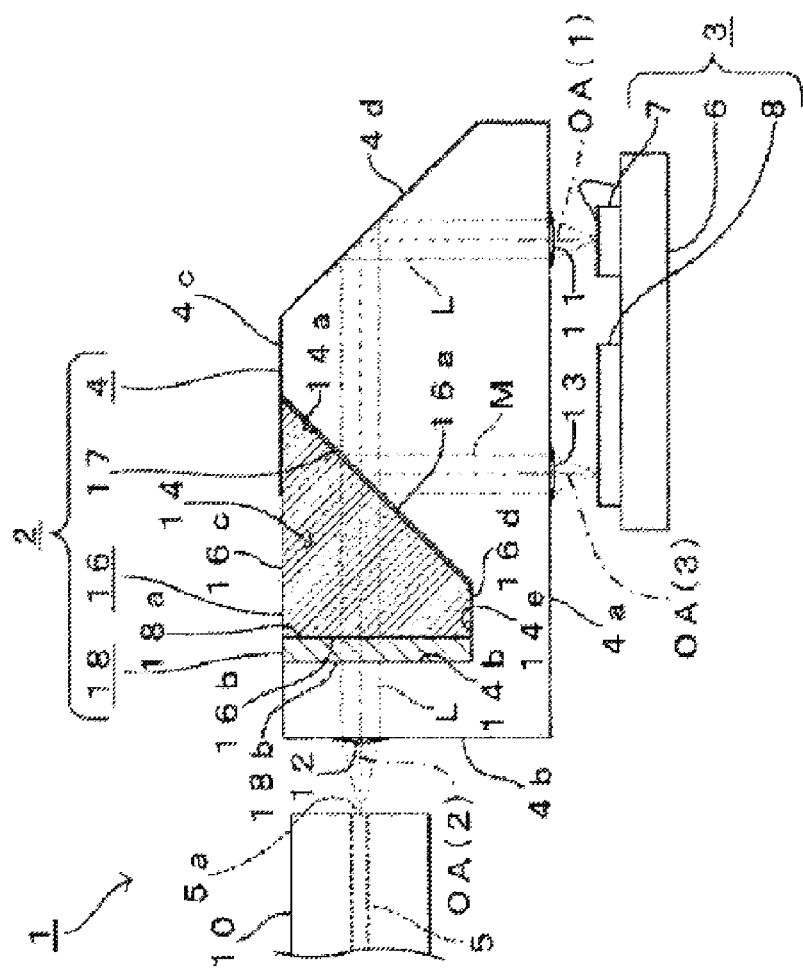
FIG. 2b illustrates a three-part optical subassembly with beam splitting function disclosed in U.S. Pat. No. 8,787,714.
Figure 2C:
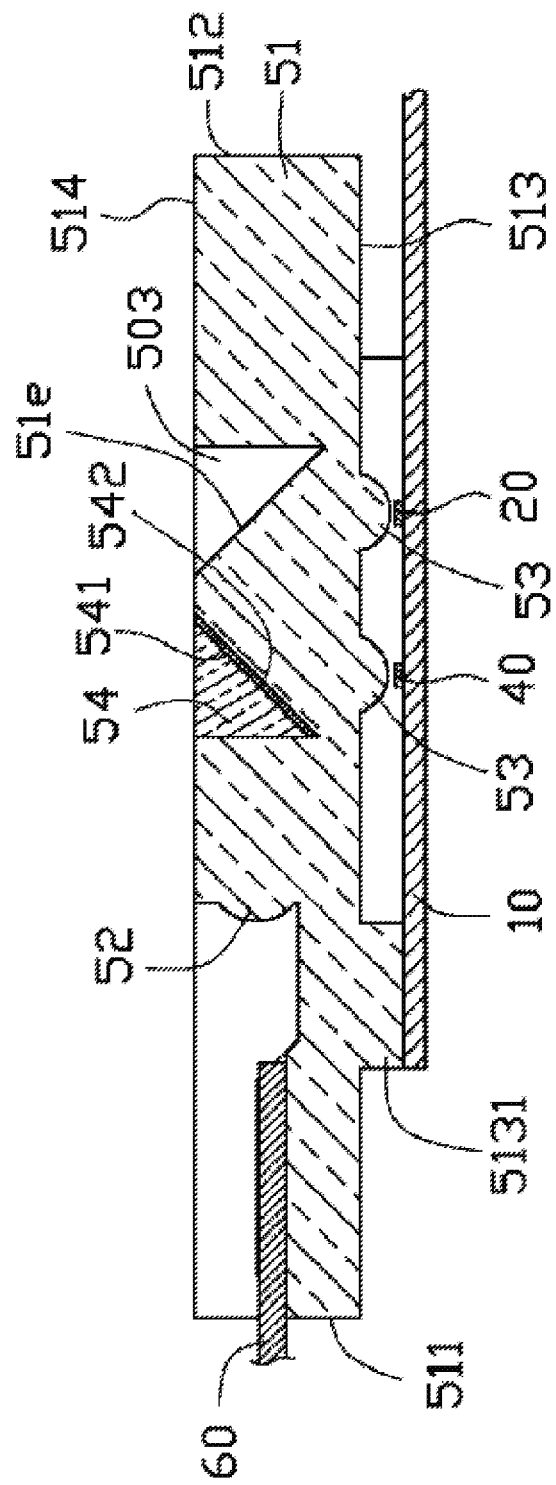
FIG. 2c illustrates a two-part optical subassembly with beam splitting function disclosed in U.S. Pat. No. 9,116,312.
Figure 2D:
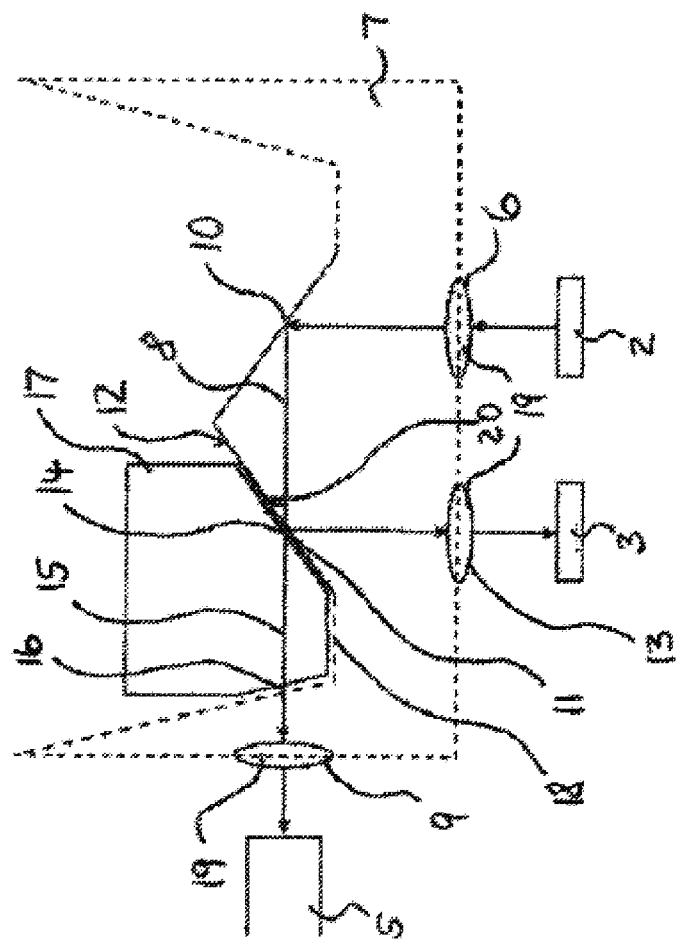
FIG. 2d illustrates a two-part optical subassembly with beam splitting function disclosed in U.S. Pat. No. 9,166,694.

FIG. 3a shows a simplified optical path when a collimated light beam passes through the interface formed between the beam splitter and the lens body shown in FIGS. 2a to 2d. Both the lens body and the beam splitter are made of Ultem. The refractive index is 1.62 at the target wavelength. A thin layer of transparent adhesive, sometime called index match resin or optical clear adhesive, is filled in the space between the two parts. Propagation of the collimated light beam is labeled from 1 to 3, i.e. in the lens body before passing the first interface, in the beam splitter, and back into the lens body respectively. The first interface is 45 degrees inclined from vertical, whereas an arbitrary off-vertical angle φ is introduced to the second interface in order to generalize the figure for discussion. In FIGS. 2a to 2c, φ is zero, whereas FIG. 2d shows a non-zero (without a specification) off-vertical angle of about 10-20 degrees. As for ordinary photonic packaging consideration, a small angle misalignment between the lens and the beam splitter represents potential process variation. When φ is equal to zero, optical surfaces forming the interface between lens body and beam splitter are parallel to each other. As such, a collimated beam transmits through the interface undergoes parallel displacement only (i.e. beam path is offset but no change in direction). Since there is no change in direction, the beam passing through the beam splitter system with merely lateral displacement will focus onto the same position on an output fiber. This phenomenon remains unchanged for different refractive index values of the transparent adhesive. A partial reflective coating can be introduced to any surface to divert a portion of beam energy for power monitoring.

When the parallelism of the lens and beam splitter surfaces is not perfect due to assembly process variation, alignment shifts due to thermal expansion as well as temperature-dependent refractive index change of materials. The output beam will slightly derivate from the designed direction. FIG. 3b calculates the change of output beam direction as a function of the angle misalignment at the interface. It can be seen that the change of beam angle after passing through a non-parallel surfaces between the lens body and beam splitter has a closed to linear relation with the angle misalignment.

FIG. 3b shows the change of beam angle when the beam passes through the second interface formed by the beam splitter and lens body inclined at an opposite direction as that of the first interface. Same misalignment angle gives a reserved beam angle change as occur on the first interface. Thus, a beam splitting system can be designed to have an output beam direction change insensitive with respect to system misalignment. Such behavior was not described in the prior arts. In detailed mathematical analysis, the positive and negative slopes of two curves passing one interface are found to be nonlinear dependent on the off-vertical angle φ. As a result, an optimized beam splitter should have the first interface and second interface inclined at the same off-vertical angle but in opposite direction.

As shown in FIG. 4, a comparison output beam angle change for prior arts and the proposed compensated beam splitter structure are calculated using the parameters mentioned in the previous paragraphs. In a typical transceiver coupling system having a fiber focus lens with 400 um effective focal length (typical value), a beam angle change of 0.3 degree leads to a 2 um optical alignment shift for light coupling into fiber. In the new scheme, the resultant beam angle change is about an order of magnitude smaller and it is expected to have no observable effect in optical alignment.

Figure 5:
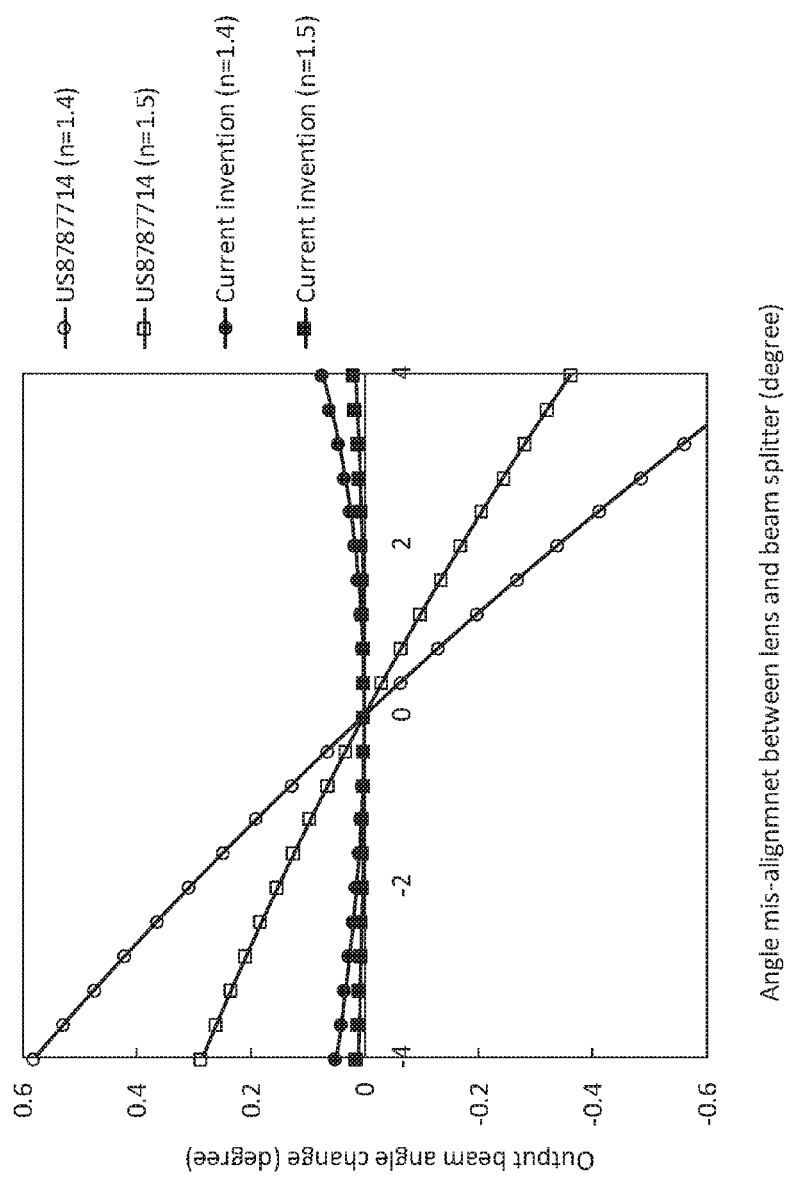
FIG. 5 shows the calculated changes of output beam angle for the optical coupling subassembly of the present application and prior arts as a function of non-parallel angle at interface using optical adhesives having different refractive indexes.

In additional, the proposed beam splitting system can work with a wide range of transparent adhesive refractive index, as shown in FIG. 5. Another advantage of the beam splitter allow a wider range of material choice for process material, and more importantly, its optical alignment remains essentially unchanged against temperature induced refractive index change of lens and adhesive. The beam splitting system employs a symmetric cavity and insert for lens and beam splitter. Reflective optical coating can be selectively deposited on a surface for easy fabrication and better performance. The beam splitter can be further designed to redirect diverted beam (i.e. a beam router), and a light detector can located at different locations.

Figure 6A:
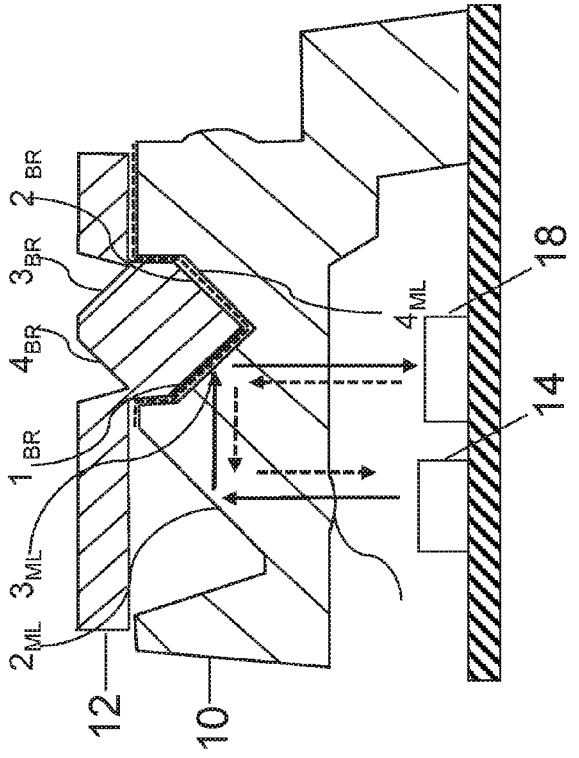
FIG. 6a illustrates the optical path of the backward propagating beam (back-reflection) from the monitoring detector when the partial reflective surface is located on the second surface on the beam router.
Figure 6B:
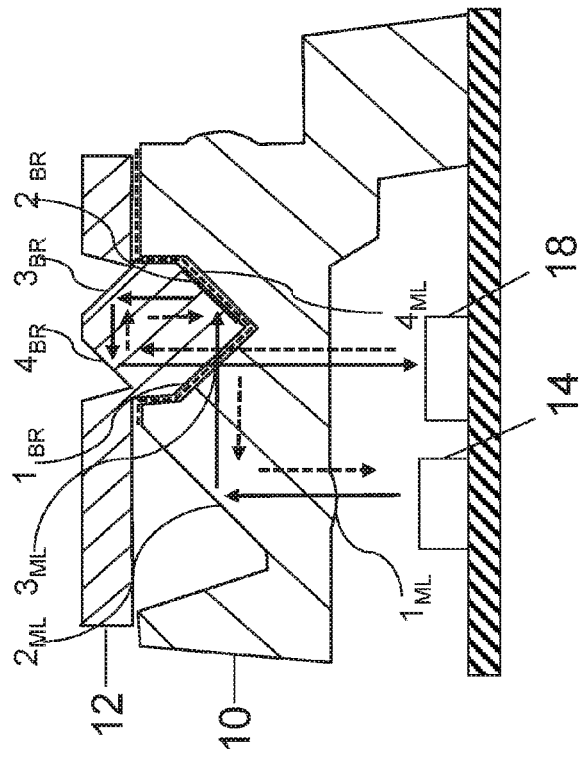
FIG. 6b illustrates the optical path of the backward propagating beam (back-reflection) from the monitoring detector when the partial reflective surface is located on the first surface on the beam router.

FIG. 6a illustrates the optical path of the backward propagating beam (back-reflection) from the monitoring detector when the partial reflective surface is located on the second surface on the beam router. FIG. 6b illustrates the optical path of the backward propagating beam (back-reflection) from the monitoring detector when the partial reflective surface is located on the first surface on the beam router.

The optical coupling subassembly of the present application can reduce optical back reflection from detector by extended optical path for the decoupled light beam. It can be seen that the backward reflecting beam goes through a longer optical path, as shown by dash lines, in FIG. 6a than that in FIG. 6b.

Figure 7:
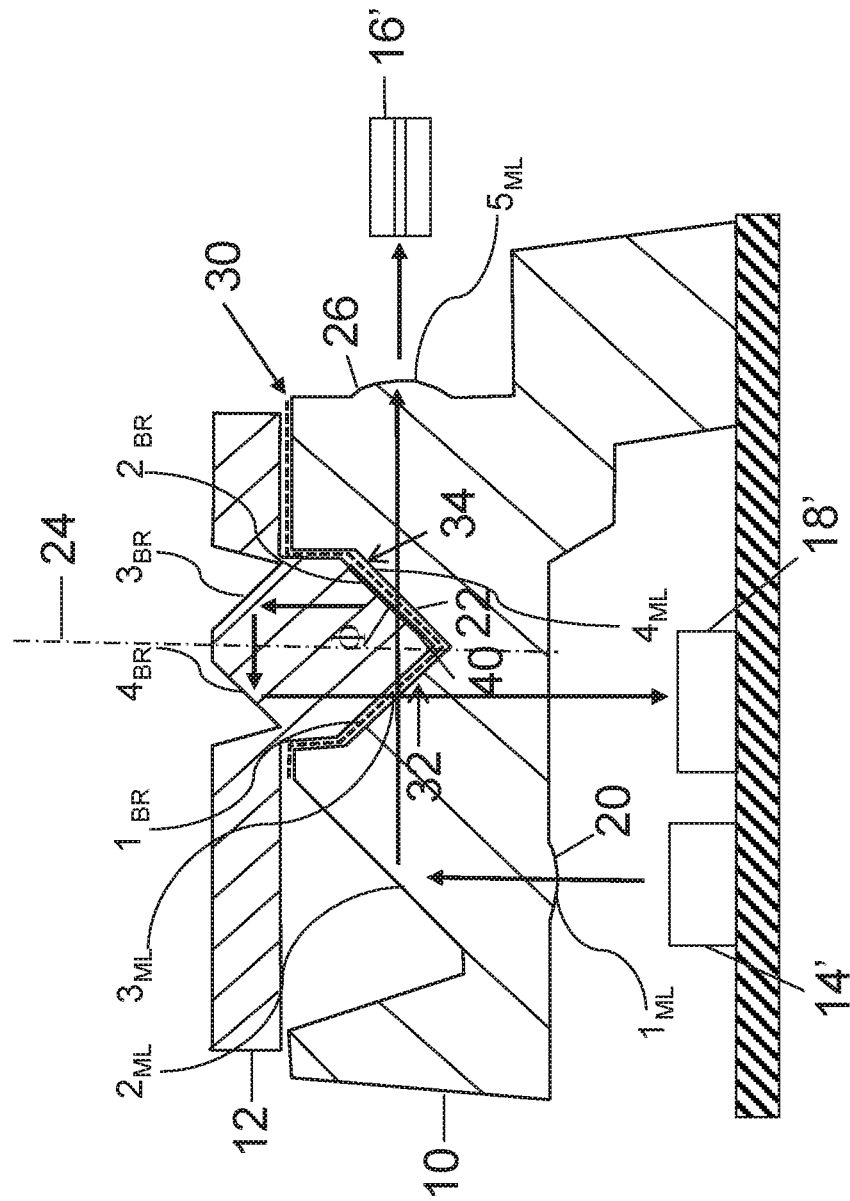
FIG. 7 illustrates the same optical design extended for the optical system including multiple light sources, monitoring detector and optical fiber arranged in an array.

FIG. 7 illustrates an optical coupling subassembly having the same optical design as in FIG. 1. The optical coupling subassembly can be a two-part optical coupling subassembly which may include a main lens 10, as a first part of the optical coupling subassembly, and a beam splitter or router 12, as a second part of the optical coupling subassembly. The main lens 10 and the beam router 12 may be made of the same material. The main lens 10 may be formed with a cavity 22. The beam router 12 may be embedded in the cavity 22 of the main lens 10.

The main lens 10 may include a first surface $1_{ML}$, a second surface $2_{ML}$, a third surface $3_{ML}$, a fourth surface $4_{ML}$, and a fifth surface $5_{ML}$.

The first surface $1_{ML}$ of the main lens 10 may be formed with a first collimating lens 20 for collimating light from a vertical-cavity surface-emitting laser (VCSEL) 14 located underneath the main lens 10.

The second surface $2_{ML}$ of the main lens 10 may be oriented at an angle (e.g. 45 degrees) with respect to the first surface $1_{ML}$ for reflecting collimated light from the first collimating lens 20 to an optical fiber 16. The light propagation direction may turn 90 degrees and may direct to the third surface $3_{ML}$.

The third surface $3_{ML}$ of the main lens 10 may be formed in the cavity 22 and inclined at an off-vertical angle φ from a central vertical plane 24 of the cavity 22. The off-vertical angle φ may be between 30 to 60 degrees, preferably 45 degrees.

The fourth surface $4_{ML}$ of the main lens 10 may be formed in the cavity 22 and oppositely inclined at the off-vertical angle φ from the central vertical plane 24 of the cavity 22 such that the third and fourth surfaces $3_{ML}$, $4_{ML}$ are symmetric with respect to the central vertical plane 24.

The fifth surface $5_{mL}$ of the main lens 10 may be facing the optical fiber 16. The fifth surface $5_{ML}$ may be formed with a lens 26 to focus light to the optical fiber 16.

The beam router 12 may include a first beam router surface $1_{BR}$ lying on the third surface $3_{ML}$, and a second beam router surface $2_{BR}$ lying on the fourth surface $4_{ML}$.

Hence, the first beam router surface $1_{BR}$ may be substantially parallel to the third surface $3_{ML}$, and the second beam router surface $2_{BR}$ may be substantially parallel to the fourth surface $4_{ML}$. A partially reflective coating 40 may be provided on the first beam router surface $1_{BR}$ or the second beam router surface $2_{BR}$ of the beam router 12.

A thin layer of transparent adhesive 30 may be provided between the third surface $3_{ML}$ and the first beam router surface $1_{BR}$, and between the fourth surface $4_{ML}$ and the second beam router surface $2_{BR}$. The transparent adhesive 30 may have a refractive index from 1.4 to 1.62.

Light emitting from the VCSEL 14 can be collimated by the collimating lens 20 formed on the first surface $1_{ML}$ of the main lens 10, and directed to the second surface $2_{ML}$ of the main lens 10. Collimated light can be reflected from the second surface $2_{ML}$ and can pass through a first interface 32 defined by the third surface $3_{ML}$, the first beam router surface $1_{BR}$ and the transparent adhesive 30 in between. The light can then enter into the beam router 12, and can then pass through a second interface 34 defined by the second beam router surface $2_{BR}$, the fourth surface $4_{ML}$ and the transparent adhesive 30 in between, re-enter the main lens 10 and propagate to the fifth surface $5_{mL}$ where the light exists the main lens 10 and directs to the optical fiber 16. A portion of the collimated light may be reflected by the partially reflective coating 40, decoupled from light transmitting towards the optical fiber 16, and directed to a light detector 18 to monitor optical output power.

The oppositely inclined first and second interfaces 32, 34 can provide self-correction of output beam angle in case of misalignment of the beam router 12 and the main lens 10.

In the embodiment shown in FIG. 7, the partially reflective coating 40 can be provided on the second beam router surface $2_{BR}$, and the beam router 12 may further include a third beam router surface $3_{BR}$ which may be provided at an opposite side of the first beam router surface $1_{BR}$, and a fourth beam router surface $4_{BR}$ which may be provided at an opposite side of the second beam router surface $2_{BR}$.

The collimated light can be partially reflected by the partially reflective coating 40 to the third beam router surface $3_{BR}$, and in turn reflects by the third beam router surface $3_{BR}$ to the fourth beam router surface $4_{BR}$, and in turn reflects by the fourth beam router surface $4_{BR}$ through the first interface 32, out of the main lens 10, and to the light detector 18, which is located underneath the main lens 10.

As shown in FIG. 7, the light source can be in the form of an array of VCSELs 14'. The main lens 10 of the optical coupling subassembly may include a plurality of lens formed on the first surface $1_{ML}$ facing and align to the VCSEL array 14', and the fifth surface $5_{ML}$ of the main lens 10 may also include a plurality of lens where beams exit and focus onto an optical fiber array 16'.

The transparent adhesive 30 between the third surface $3_{ML}$ and the first beam router surface $1_{BR}$, and between the fourth surface $4_{ML}$ and the second beam router surface $2_{BR}$ may have a refractive index from 1.4 to 1.62.

The pair of oppositely inclined interfaces 32, 34 within the optical path formed between the main lens 10 and the beam router 12 can provide self-correction for output beams' angle upon beam router alignment variation.

Three effects can be obtained by the optical coupling subassembly of the present application, namely (1) optical coupling efficiency from the VCSEL 14 to fiber 16 allows greater assembly process variation (misalignment) without degrading; (2) allows a wider selection of material for the transparent adhesive 30 to be used in assembly process; and (3) optical alignment remains stable upon temperature-induced refractive index changes in lens material and transparent adhesive.

Figure 8:
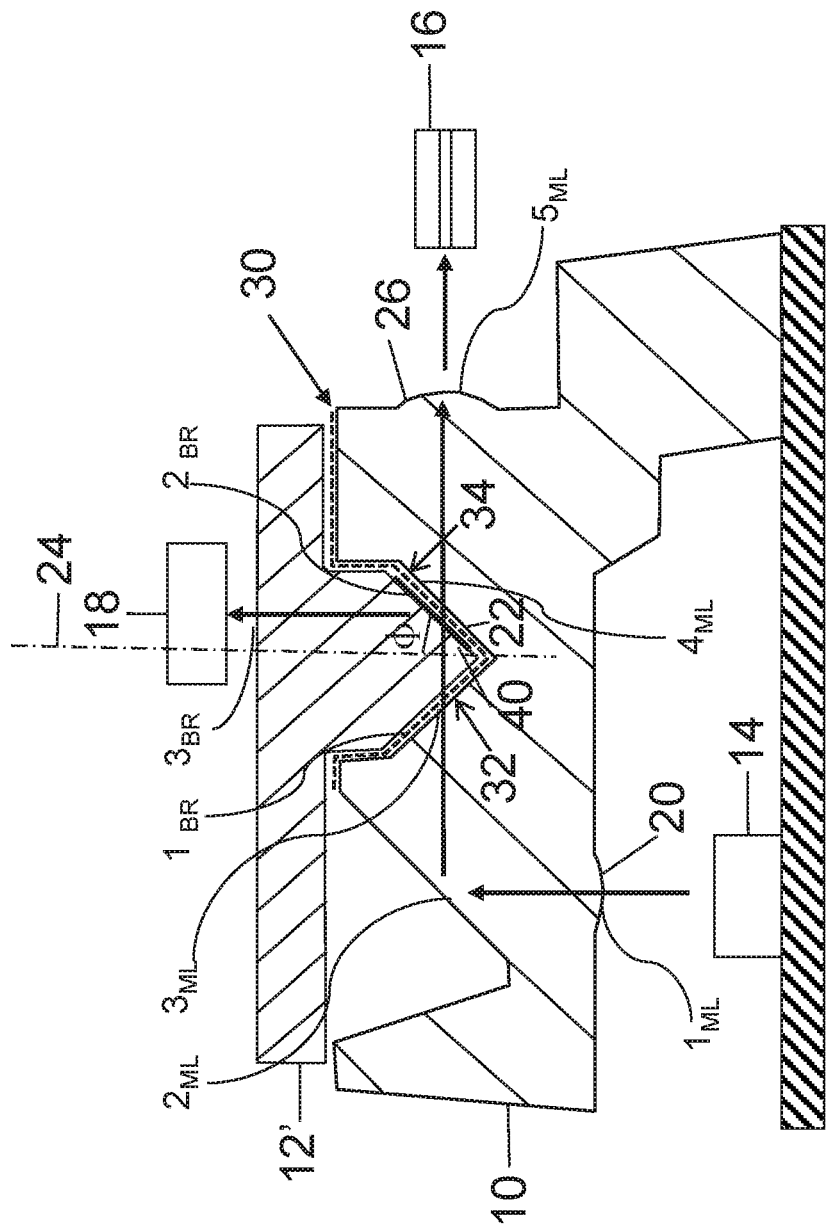
FIG. 8 illustrates another embodiment of the optical system in which the monitoring detector is located on the top of the beam router.

FIG. 8 illustrates another embodiment of the optical coupling subassembly in which the detector may be located on top of the beam router.

Similar to the previous embodiment, the optical coupling subassembly may include a main lens 10 and a beam splitter or router 12'. The main lens 10 may be formed with a cavity 22. The beam router 12' may be embedded in the cavity 22 of the main lens 10.

The main lens 10 may include a first surface $1_{ML}$, a second surface $2_{ML}$, a third surface $3_{ML}$, a fourth surface $4_{ML}$, and a fifth surface $5_{ML}$.

The first surface $1_{ML}$ of the main lens 10 may be formed with a first collimating lens 20 for collimating light from a vertical-cavity surface-emitting laser (VCSEL) 14 located underneath the main lens 10.

The second surface $2_{ML}$ of the main lens 10 may be oriented at an angle (e.g. 45 degrees) with respect to the first surface $1_{ML}$ for reflecting collimated light from the first collimating lens 20 to an optical fiber 16. The light propagation direction may turn 90 degrees and may direct to the third surface $3_{ML}$.

The third surface $3_{ML}$ of the main lens 10 may be formed on the cavity 22 and inclined at an off-vertical angle φ from a central vertical plane 24 of the cavity 22. The off-vertical angle φ may be between 30 to 60 degrees, preferably 45 degrees.

The fourth surface $4_{ML}$ of the main lens 10 may be formed on the cavity 22 and oppositely inclined at the off-vertical angle φ such that the third and fourth surfaces $3_{ML}$, $4_{ML}$ are symmetric with respect to the central vertical plane 24.

The fifth surface $5_{ML}$ of the main lens 10 may be facing the optical fiber 16.

The beam router 12' may include a first beam router surface $1_{BR}$ lying on the third surface $3_{ML}$, and a second beam router surface $2_{BR}$ lying on the fourth surface $4_{ML}$. Hence, the first beam router surface $1_{BR}$ may be substantially parallel to the third surface $3_{ML}$, and the second beam router surface $2_{BR}$ may be substantially parallel to the fourth surface $4_{ML}$. A partially reflective coating 40 may be provided on the first beam router surface $1_{BR}$ or the second beam router surface $2_{BR}$ of the beam router 12'.

A thin layer of transparent adhesive 30 may be provided between the third surface $3_{ML}$ and the first beam router surface $1_{BR}$, and between the fourth surface $4_{ML}$ and the second beam router surface $2_{BR}$.

Light emitting from the VCSEL 14 can be collimated by the collimating lens 20 formed on the first surface $1_{ML}$ of the main lens 10, and directed to the second surface $2_{ML}$ of the main lens 10. Collimated light can be reflected from the second surface $2_{ML}$ and can pass through a first interface 32 defined by the third surface $3_{ML}$, the first beam router surface $1_{BR}$ and the transparent adhesive 30 in between. The light can then pass through the beam router 12', and then through a second interface 34 defined by the second beam router surface $2_{BR}$, the fourth surface $4_{ML}$ and the transparent adhesive 30 in between. A portion of the collimated light may be reflected by the partially reflective coating 40, decoupled from the light transmitting towards the optical fiber 16, and directed to a light detector 18 to monitor optical output power.

In the present embodiment, the partially reflective coating 40 may be provided on the second beam router surface $2_{BR}$, and the beam router 12' may include a third beam router surface $3_{BR}$ formed on an upper, top side of the beam router 12'. This third beam router surface $3_{BR}$ may be a horizontal surface, which is parallel to the first surface $1_{ML}$ of the main lens 10.

The collimated light reflected from the second surface $2_{ML}$ may pass through the first interface 32, and enter into the beam router 12', and the light may be partially reflected by the partially reflective coating 40 and decoupled from light transmitting towards the optical fiber 16. The decoupled light may pass through the beam router 12' and propagate to the third beam router surface $3_{BR}$ where the light may exit the beam router 12' and direct to the light detector 18, which is located above the beam router 12'.

Figure 9:
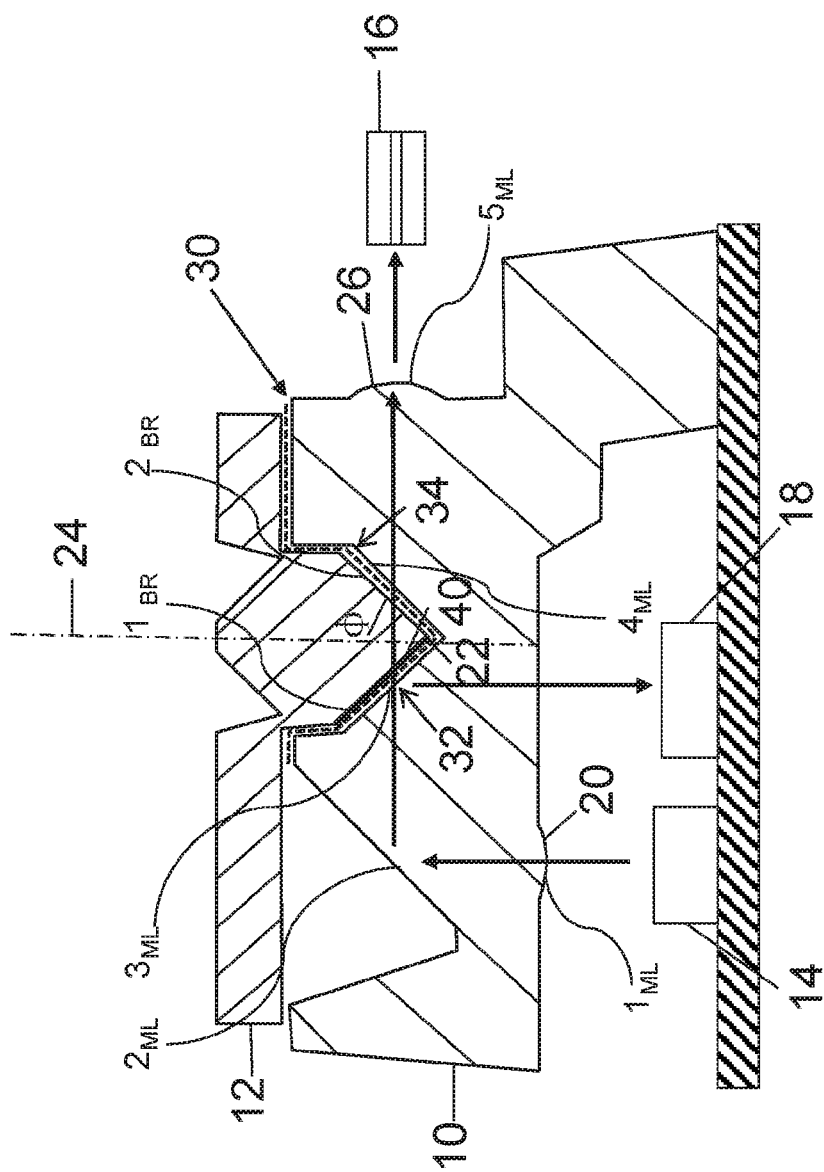
FIG. 9 illustrates another embodiment of an optical monitoring path when the partial reflective surface is located on a first surface of the beam router.

FIG. 9 illustrates a further embodiment of the optical monitoring path when the partial reflective surface is located on a first surface of the beam router.

Similar to the previous embodiment, the optical coupling subassembly may include a main lens 10 and a beam splitter or router 12. The main lens 10 may be formed with a cavity 22. The beam router 12 may be embedded in the cavity 22 of the main lens 10.

The main lens 10 may include a first surface $1_{ML}$, a second surface $2_{ML}$, a third surface $3_{ML}$, a fourth surface $4_{ML}$, and a fifth surface $5_{ML}$.

The first surface $1_{ML}$ of the main lens 10 may be formed with a first collimating lens 20 for collimating light from a vertical-cavity surface-emitting laser (VCSEL) 14 located underneath the main lens 10.

The second surface $2_{ML}$ of the main lens 10 may be oriented at an angle (e.g. 45 degrees) with respect to the first surface $1_{ML}$ for reflecting collimated light from the first collimating lens 20 to an optical fiber 16. The light propagation direction may turn 90 degrees and may direct to the third surface $3_{ML}$.

The third surface $3_{ML}$ of the main lens 10 may be formed on the cavity 22 and inclined at an off-vertical angle φ from a central vertical plane 24 of the cavity 22. The off-vertical angle φ may be between 30 to 60 degrees, preferably 45 degrees.

The fourth surface $4_{ML}$ of the main lens 10 may be formed on the cavity 22 and oppositely inclined at the off-vertical angle φ such that the third and fourth surfaces $3_{ML}$, $4_{ML}$ are symmetric with respect to the central vertical plane 24.

The fifth surface $5_{ML}$ of the main lens 10 may be facing the optical fiber 16.

The beam router 12 may include a first beam router surface $1_{BR}$ lying on the third surface $3_{ML}$, and a second beam router surface $2_{BR}$ lying on the fourth surface $4_{ML}$. Hence, the first beam router surface $1_{BR}$ may be substantially parallel to the third surface $3_{ML}$, and the second beam router surface $2_{BR}$ may be substantially parallel to the fourth surface $4_{ML}$. A partially reflective coating 40 may be provided on the first beam router surface $1_{BR}$ or the second beam router surface $2_{BR}$ of the beam router 12.

A thin layer of transparent adhesive 30 may be provided between the third surface $3_{ML}$ and the first beam router surface $1_{BR}$, and between the fourth surface $4_{ML}$ and the second beam router surface $2_{BR}$.

Light emitting from the VCSEL 14 can be collimated by the collimating lens 20 formed on the first surface $1_{ML}$ of the main lens 10, and directed to the second surface $2_{ML}$ of the main lens 10. Collimated light can be reflected from the second surface $2_{ML}$ and can pass through a first interface 32 defined by the third surface $3_{ML}$, the first beam router surface $1_{BR}$ and the transparent adhesive 30 in between. The light can then pass through the beam router 12, and then through a second interface 34 defined by the second beam router surface $2_{BR}$, the fourth surface $4_{ML}$ and the transparent adhesive 30 in between. A portion of the collimated light may be reflected by the partially reflective coating 40, decoupled from the light transmitting towards the optical fiber 16, and directed to a light detector 18 to monitor optical output power.

In the present embodiment, the partially reflective coating 40 may be provided on the first beam router surface $1_{BR}$ of the beam router 12. The collimated light reflected from the second surface $2_{ML}$ may be partially reflected from the partially reflective coating 40 and decoupled from the light transmitting towards the optical fiber 16. The decoupled light may pass through the transparent adhesive 30 and the third surface $3_{ML}$, re-enter the main lens 10, and propagate to the first surface $1_{ML}$ where the light may exit the main lens 10 and direct to the light detector 18, which is located underneath the main lens 10.

Depending on applications, any one of the surfaces on the optical coupling subassembly where the reflected beam exits and directs to the light detector, as well as the beam directing to the optical fiber may further include a focusing optic to assist light coupling.

The surfaces on the optical coupling subassembly where light beam enters or exits may further be provided with an optical coating to increase or decrease light transmission.

The partially reflective coating on the beam router may include at least one layer of dielectric thin film with a refractive index ranging from 1.3 to 2.3 to provide a reflectivity of 0.01 to 0.95 in the optical coupling subassembly.

The partially reflective coating on the beam router can be used solely as light decoupling purpose from the fiber output without a detector to receive the beam exiting the optical coupling subassembly.

While the optical coupling subassembly has been shown and described with particular references to a number of preferred embodiments thereof, it should be noted that various other changes or modifications may be made without departing from the scope of the appended claims.

What is claimed is:

1. A two-part optical coupling subassembly comprising:
    a main lens formed with a cavity, the main lens comprising:
        a first surface formed with a first collimating lens for collimating light from a vertical-cavity surface-emitting laser;
        a second surface oriented at an angle with respect to the first surface for reflecting collimated light from the first collimating lens to an optical fiber;
        a third surface formed in the cavity and inclined at an off-vertical angle from a central vertical plane of the cavity;
        a fourth surface formed in the cavity and oppositely inclined at the off-vertical angle from the central vertical plane such that the third and fourth surfaces are symmetric with respect to the central vertical plane; and
        a fifth surface facing the optical fiber;
    a beam router embedded in the cavity, the beam router comprising:
        a first beam router surface lying on the third surface of the main lens;
        a second beam router surface lying on the fourth surface of the main lens; and
        a partially reflective coating provided on one of the first and second beam router surfaces;
    and a transparent adhesive provided between the third surface and the first beam router surface, and between the fourth surface and the second beam router surface;
    wherein collimated light reflected from the second surface of the main lens passes through a first interface defined by the third surface, the first beam router surface and the transparent adhesive in between, enters into the beam router, passes through a second interface defined by the second beam router surface, the fourth surface of the main lens and the transparent adhesive in between, re-enters the main lens and propagates to the fifth surface of the main lens where the light exits and directs to the optical fiber; and wherein a portion of the collimated light is reflected by the partially reflective coating, decoupled from light transmitting towards the optical fiber, and directed to a light detector to monitor optical output power;
    whereby the oppositely inclined first and second interfaces provide self-correction of output beam angle in case of misalignment of the beam router and the main lens;
    wherein the partially reflective coating is provided on the second beam router surface, and the beam router further comprises:
    (i) a third beam router surface provided at an opposite side of the first beam router surface; and a fourth beam router surface provided at an opposite side of the second beam router surface; wherein the collimated light is partially reflected by the partially reflective coating to the third beam router surface and in turn reflected by the third beam router surface to the fourth beam router surface, and in turn reflected by the fourth beam router surface through the first interface, out of the main lens, and to the light detector, which is located underneath the main lens; or
    (ii) a third beam router surface formed on an upper, top side of the beam router; and wherein the collimated light reflected from the second surface passes through the first interface and enters into the beam router, and the light is partially reflected by the partially reflective coating and decoupled from light transmitting towards the optical fiber, and the decoupled light passes through the beam router and propagates to the third beam router surface where the light exits the beam router and directs to the light detector, which is located above the beam router.

2. The two-part optical coupling subassembly as claimed in claim 1, wherein the partially reflective coating is provided on the first beam router surface; and wherein the collimated light reflected from the second surface of the main lens is partially reflected from the partially reflective coating and decoupled from light transmitting towards the optical fiber, and the decoupled light re-enters the main lens and propagates to the first surface of the main lens where the light exits and directs to the light detector, which is located underneath the main lens.

3. The two-part optical coupling subassembly as claimed in claim 1, wherein the off-vertical angle is between 30 to 60 degrees.

4. The two-part optical coupling subassembly as claimed in claim 3, wherein the off-vertical angle is 45 degrees.

5. The two-part optical coupling subassembly as claimed in claim 1, wherein the fifth surface is formed with a lens to focus light to the optical fiber.

6. The two-part optical coupling subassembly as claimed in claim 1, wherein an optical coating is provided on one or more of the lens surfaces and the beam router surfaces to increase or decrease light transmission.

7. The two-part optical coupling subassembly as claimed in claim 1, wherein the partially reflective coating comprises at least one layer of dielectric film with a refractive index ranging from 1.3 to 2.3 to provide a reflectivity of 0.01 to 0.95 in the optical coupling subassembly.

8. An optical coupling subassembly comprising:
a main lens formed with a cavity, the main lens comprising two surfaces formed in the cavity and oppositely inclined at an off-vertical angle from a central vertical plane of the cavity such that the two surfaces are symmetric with respect to the central vertical plane;
a beam router embedded in the cavity, the beam router comprising a first beam router surface lying on one of the two surfaces; a second beam router surface lying on another one of the two surfaces; and a partially reflective coating provided on one of the first and second beam router surfaces; and
a transparent adhesive provided between one of the two surfaces and the first beam router surface, and between another one of the two surfaces and the second beam router surface;
wherein the main lens thither comprises:
a first surface formed with a first collimating lens for collimating light from a vertical-cavity surface-emitting laser;
a second surface oriented at an respect to the first surface for reflecting collimated light from the first collimating lens to an optical fiber;
a third surface, being one of the two surfaces formed in the cavity and inclined at the off-vertical angle from the central vertical plane of the cavity;
a fourth surface, being another one of the two surfaces formed in the cavity and oppositely inclined at the off-vertical angle from the central vertical plane such that the third and fourth surfaces are symmetric with respect to the central vertical plane; and
a fifth surface facing the optical fiber;
wherein collimated light reflected from the second surface passes through a first interface defined by the third surface, the first beam router surface and the transparent adhesive in between, enters into the beam router, passes through a second interface defined by the second beam router surface, the fourth surface and the transparent adhesive in between, re-enters the main lens and propagates to the fifth surface where the light exits the main lens and directs to the optical fiber; and wherein a portion of the collimated light is reflected by the partially reflective coating, decoupled from light transmitting towards the optical fiber, and directed to a light detector to monitor optical output power;
whereby the oppositely inclined first and second interfaces provide self-correction of output beam angle in case of misalignment of the beam router and the main lens;
wherein the partially reflective coating is provided on the second beam router surface, and the beam router further comprises:
(i) a third beam router surface provided at an opposite side of the first beam router surface; and a fourth beam router surface provided at an opposite side of the second beam router surface; wherein the collimated light is partially reflected by the partially reflective coating to the third beam router surface, and in turn reflected by the third beam router surface to the fourth beam router surface, and in turn reflected by the fourth beam router surface through the first interface, out of the main lens, and to the light detector, which is located underneath the main lens; or
ii) a third beam router surface formed on an upper, top side of the beam router; and wherein the collimated light reflected from the second surface passes through the first interface and enters into the beam router, and the light is partially reflected by the partially reflective coating and decoupled from light transmitting towards the optical fiber and the decoupled light passes through the beam router and propagates to the third beam router surface where the light exits the beam router and directs to the light detector, which is located above the beam router.

9. The optical coupling subassembly as claimed in claim 8, wherein the partially reflective coating is provided on the first beam router surface; and
wherein the collimated light reflected from the second surface is partially reflected from the partially reflective coating and decoupled from light transmitting towards the optical fiber, and the decoupled light re-enters the main lens and propagates to the first surface where the light exits the main lens and directs to the light detector, which is located underneath the main lens.

10. The optical coupling subassembly as claimed in claim 8, wherein the off-vertical angle is between 30 to 60 degrees.

11. The optical coupling subassembly as claimed in claim 10, wherein the off-vertical angle is 45 degrees.

12. The optical coupling subassembly as claimed in claim 8, wherein the fifth surface is formed with a lens to focus light to the optical fiber.

13. The optical coupling subassembly as claimed in claim 8, wherein an optical coating is provided on one or more of the lens surfaces and the beam router surfaces to increase or decrease light transmission.

14. The optical coupling subassembly as claimed in claim 8, wherein the partially reflective coating comprises at least one layer of dielectric film with a refractive index ranging from 1.3 to 2.3 to provide a reflectivity of 0.01 to 0.95 in the optical coupling subassembly.

* * * * *